United States Patent [19]

Ogawa

[11] Patent Number: 4,962,352
[45] Date of Patent: Oct. 9, 1990

[54] ABNORMAL WATCHING DEVICE AND METHOD FOR MICROCOMPUTER

[75] Inventor: Kenichi Ogawa, Toyota, Japan

[73] Assignee: Aisin Seiki Kabushiki Kaisha, Aichi, Japan

[21] Appl. No.: 247,554

[22] Filed: Sep. 22, 1988

[30] Foreign Application Priority Data

Sep. 22, 1987 [JP] Japan .................................. 62-237719

[51] Int. Cl.[5] .............................................. G06F 11/30
[52] U.S. Cl. .................................... 324/73.1; 371/16.3
[58] Field of Search ...................... 324/73 R, 549, 525, 324/73.1; 371/9, 16, 62, 16.3, 9.1

[56] References Cited

U.S. PATENT DOCUMENTS 4,541,050  9/1985  Honda et al. .................... 364/431.11
4,698,589  10/1987 Blankenship et al. ............. 324/550
4,803,682  2/1989  Hara et al. ............................ 371/62
4,817,091  3/1989  Katzman et al. ..................... 371/62

OTHER PUBLICATIONS

Watch Dog Timer Interface, IBM Technical Disclosure Bulletin, vol. 30, No. 11, 4/88.

Primary Examiner—Reinhard J. Eisenzopf
Assistant Examiner—Edward Urban
Attorney, Agent, or Firm—Sughrue, Mion, Zinn, Macpeak & Seas

[57] ABSTRACT

An abnormal watching method for a microcomputer including a flow watching step for determining whether the flow of the microcomputer is normal or not, sending a normal signal when it is determined that the flow of the microcomputer is normal, and reading an internal register of the microcomputer, comparing the value of the internal register with an initial value of the internal register, and suspending the sending of the normal signal when the value of the internal register is not equal to the initial value, and an abnormal watching device for a microcomputer using this method.

8 Claims, 2 Drawing Sheets

ABNORMAL WATCHING DEVICE AND METHOD FOR MICROCOMPUTER

FIELD OF THE INVENTION

This invention relates to an abnormal watching device and an abnormal watching method for a microcomputer, and more particularly to an abnormal watching device and method for a microcomputer which is provided with a safety system for determining an abnormal movement of the microcomputer.

BACKGROUND OF THE INVENTION

This kind of system is mentioned in a Japanese patent application No. 61(1986)-6061. This application discloses a system having a fail-safe means. The fail-safe means consists of a generation means which is included in a microcomputer as a program, and is operable for generating a pumping signal which has a constant frequency or duty ratio, and a driving means which judges whether the frequency or duty ratio of the pumping signal from the generation means is normal or not, and the driving means is operable for driving an actuator to a "safety side" in the abnormal case.

In a Japanese patent Laid-open application No. 60(1985)-205373, the same kind of system is mentioned. This application discloses a system having a fail-safe means in the same way. The fail-safe means consists of a generation means which is included in a microcomputer as a program and is operable for generating a pumping signal which has a constant frequency, and a resetting means which judges whether the frequency is normal or not, and the resetting means is operable for resetting the microcomputer in the abnormal case.

In these prior art systems, the generation means is included in a program of the microcomputer. For example, a step for setting a pumping flag as "1" is set to a place which is surely passed in a main routine of the microcomputer, and in a timer interrupt of the microcomputer, the pumping signal is turned over when the pumping flag is set as "1". If the movement of the microcomputer is normal, then the pumping signal is turned over at a constant interval, and therefore the abnormality of the microcomputer can be detected.

SUMMARY OF THE INVENTION

However, the prior art systems are unable to consider that the main routine and timer interruption of the microcomputer are normal and the other part abnormal. For example, a microcomputer has a data direction register for setting a port whether input port or output port. If the value of the data direction register is changed from the initial predetermined value to another value by some reason, a port used as an input port is changed to an output port and a port used as an output port is changed to an input port. At this time, the control system is not normally actuated, and further it is possible to fail by a short circuit between the port of the microcomputer and the external circuit connected to the port of the microcomputer. However, the main routine of the microcomputer and the timer interruption are normally actuated so that the pumping signal shows that the microcomputer is normal. On the other hand, a microcomputer has some interruption functions. However, if the value of a masking register for determining the allowance and disallowance of the interruption is changed from the initial predetermined value to another value by some reason, a necessary interruption is not actuated or an unnecessary interruption is actuated so that the usual function cannot be satisfied. However, the main routine of the microcomputer and the timer interruption used for the pumping process is actuated as usual, so that the pumping signal shows that the microcomputer is normal.

Accordingly, the conventional system is not provided with a protect means against the fail of the microcomputer in which the value of the internal register of the microcomputer is replaced to another value.

An object of the invention is to provide an abnormal watching device and method for a microcomputer which has a protect means against the situation in which the value of the internal register of the microcomputer is replaced to another value.

Other and further objects of this invention will become apparent upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
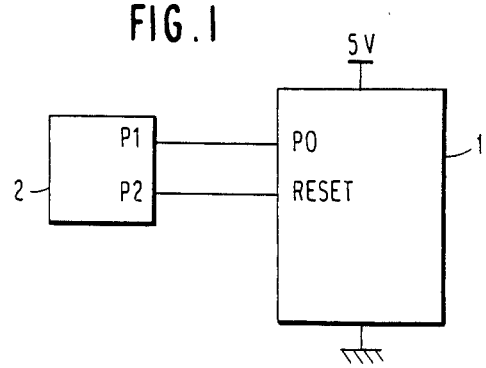
FIG. 1 shows a circuit diagram of an embodiment of the invention.

In the exemplary embodiment of the invention as disclosed in the drawings, FIG. 1 illustrates a circuit diagram of a circuit that uses the abnormal watching device and resets the microcomputer at the abnormal state. An output port P0 of a microcomputer 1 is connected to an input port P1 of a runaway resetting circuit 2. An output port P2 of the runaway resetting circuit 2 is connected to an resetting terminal RESET of the microcomputer 1. A pumping signal is sent from the output port P0 to the input port P1.

Figure 2:
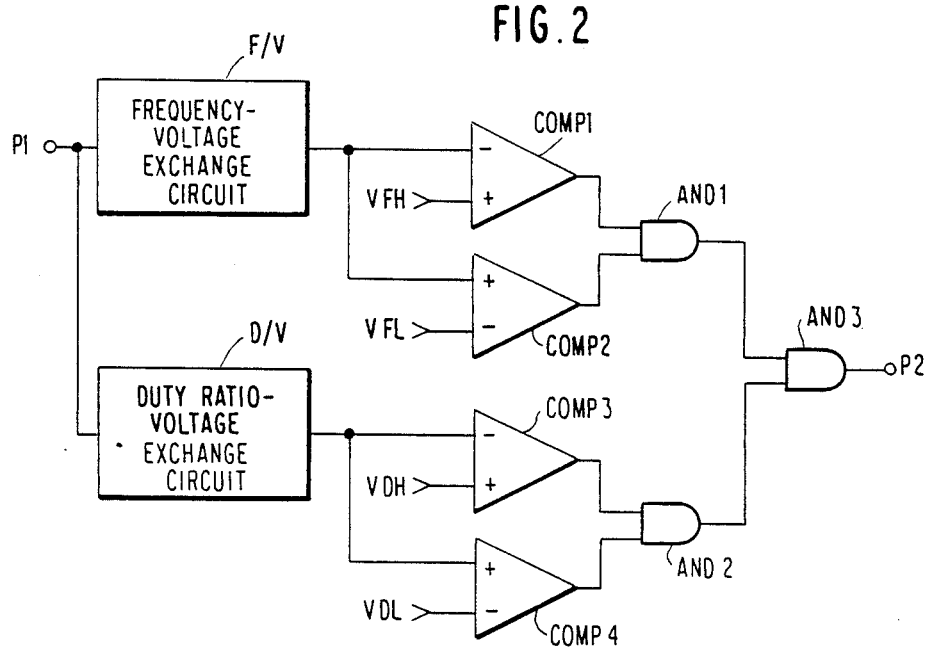
FIG. 2 shows a circuit diagram of a runaway resetting circuit in FIG. 1.

FIG. 2 illustrates a circuit diagram of the runaway resetting circuit 2. The input port P1 is connected to an input of a frequency-voltage exchange circuit F/V and a duty ratio-voltage exchange circuit D/V, respectively. The duty ratio-voltage exchange circuit D/V may include a low pass filter or an integrated circuit. An output of the frequency-voltage exchange circuit F/V and a threshold voltage VFH are connected to two input terminals of a comparator COMP1, respectively. An output of the frequency-voltage exchange circuit F/V and a threshold voltage VFL are connected to two input terminals of a comparator COMP2, respectively. The threshold voltage VFH is set larger than the threshold voltage VFL. Each output port of the comparator COMP1 and COMP2 are connected to an input terminal of an AND circuit AND1. An output of the duty ratio-voltage exchange circuit D/V and a threshold voltage VDH are connected to two input terminals of a comparator COMP3, respectively. An output of the duty ratio-voltage exchange circuit D/V and a threshold voltage VDL are connected to two input terminal of a comparator COMP4, respectively. The threshold voltage VDH is set larger than the threshold voltage VDL. Each output port of the comparator COMP3 and COMP4 are connected to an input terminal of an AND circuit AND2. The output port of the AND circuits AND1 and AND2 are connected to two input terminals of an AND circuit AND3, respectively. The output terminal of the AND circuit AND3 is connected to the output port P2.

This runaway resetting circuit 2 acts as follows. When the output voltage of the frequency-voltage exchange circuit F/V is larger than the threshold voltage VFH or smaller than the threshold voltage VFL, the output of each of the comparators COMP1 or COMP2 is turned to a low level, and therefore the output of the AND circuit AND1 is turned to a low level. When the output voltage of the duty ratio-voltage exchange circuit D/V is larger than the threshold voltage VDH or smaller than the threshold voltage VDL, then the output of each of the comparators COMP3 or COMP4 is turned to a low level, and therefore the output of the AND circuit AND2 is turned to a low level. When the output of the AND circuit AND1 or AND2 is a low level, then the AND circuit AND3 outputs a low level signal. Accordingly, when the frequency or the duty ratio of the input port P1 is out of the area of frequency and duty ratio decided by threshold voltages VFL, VFH, VDL and VDH, the voltage of the output port P2 is turned to a low level. When the frequency or the duty ratio of the input port P1 is in the area of frequency and duty ratio decided by threshold voltages VFL, VFH, VDL and VDH, the voltage of the output port P2 is turned to a high level. The output port P2 is connected to the resetting terminal RESET of the microcomputer 1, and when the resetting terminal RESET is turned to a low level, the microcomputer 1 is reset. Accordingly, when the frequency or the duty ratio of the signal supplied from output P0 of microcomputer 1 to input port P1 is abnormal, then the microcomputer 1 is reset.

Figures 3, 4:
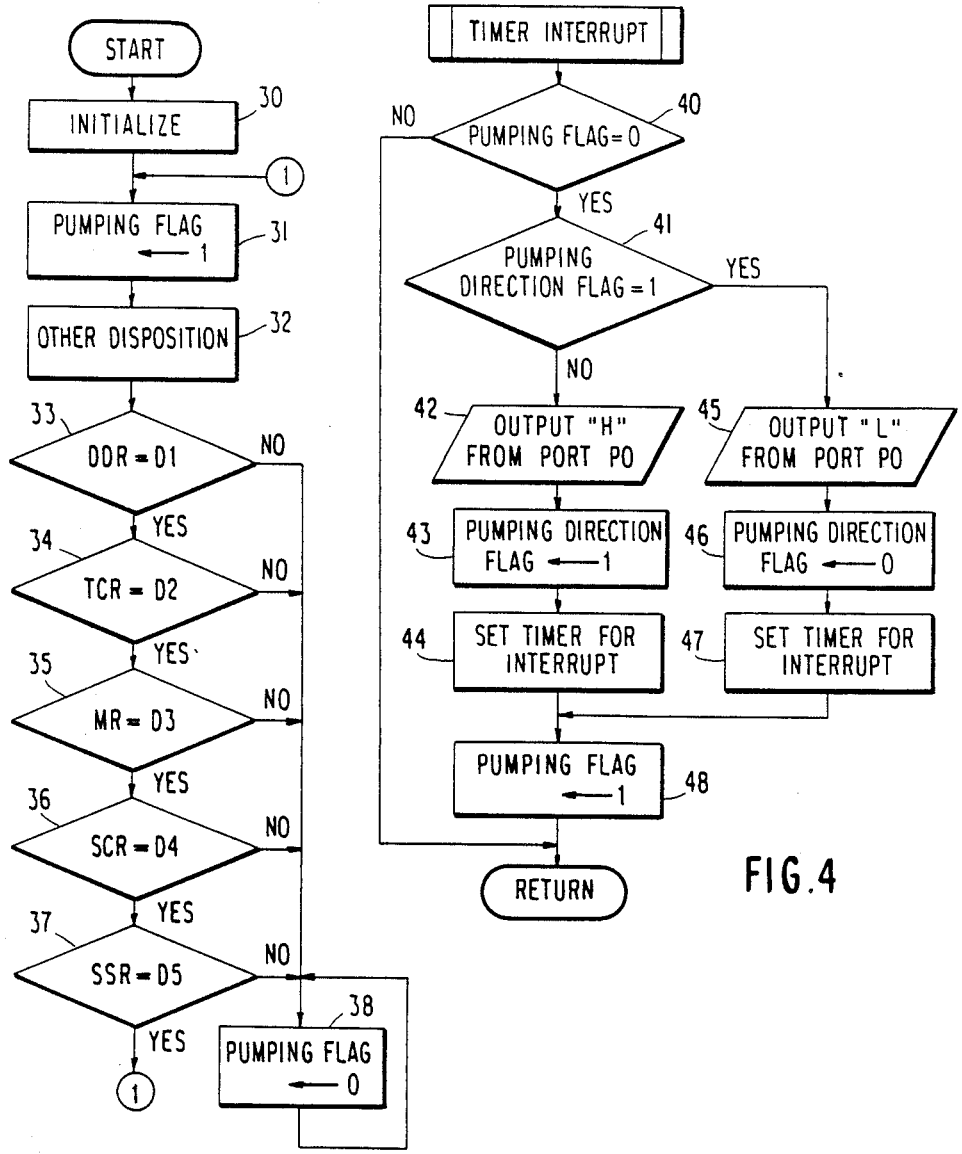
FIG. 3 shows a flow chart of a main routine of the microcomputer in FIG. 1.
FIG. 4 shows a flow chart of a timer interruption routine of the microcomputer in FIG. 1.

FIG. 3 and FIG. 4 illustrate flow charts of the microcomputer 1. After the microcomputer 1 starts, the value of the memory or internal register in the microcomputer 1 is initialized. The microcomputer 1 has a data direction register DDR, a timer control register TCR, a miscellaneous register MR, an SCI control register SCR and an SCI status register SSR. The data direction register DDR is a register for setting input-output common terminals to determine an input port or an output port, respectively. The timer control register TCR is a register for controlling a choice of clock source for prescaler, a choice of prescaler division ratio and a timer interrupt request. The miscellaneous register MR is a register for controlling external interrupts. The SCI control register SCR is a register for controlling a serial communication interface (SCI). The SCI status register SSR is a register for deciding the status of the SCI. In step 30, these registers are set to value D1, D2, D3, D4 and D5 which are initial values, respectively.

In step 31, a value "1" is set to a pumping flag which decides whether a pumping signal may be sent to the runaway resetting circuit 2 or not. After that, an original disposition of the device including the abnormal watching device is executed in step 32.

After the step 32, it is checked in steps 33 to 37 to determine whether the value of the inner register are the same as their initial values or not. When the value of the data direction register DDR, the timer control resister TCR, the miscellaneous register MR, the SCI control register SCR and SCI status register SSR are D1, D2, D3, D4 and D5, respectively, step 31 is executed. When at least one of the values of these registers is not equal to its respective value, then step 38 is executed. In step 38, the pumping flag is set to "0", and an endless loop is executed. The microcomputer cannot leave the endless loop except by the resetting of the microcomputer 1. The above steps 33 to 38 consist of an internal register comparative means.

The microcomputer 1 has a timer interruption. A timer for the interruption is decreased by one whenever one machine cycle is passed. When the timer for the interruption is made equal to "0", a timer interruption routine in FIG. 4 is executed. The steps 31, 40 and 48 consist of flow watching means and the steps 41 to 47 consist of a signal sending means.

In step 40, when the value of the pumping flag is "1", step 41 is executed. When the value of the pumping flag is "0", the timer interruption ends and directs the process back to the main routine. In step 41, a pumping direction flag is checked. The pumping direction flag is programmed to indicate the polarity of the pumping output. The pumping direction flag becomes "1" when the polarity of the output of the pumping is "H" (HIGH) and becomes "0" when the polarity of the output of the pumping is "L" (LOW). When the present polarity of the pumping output is "L", a high level signal is sent from output port P0 in step 42 and the polarity of the pumping output is turned to "H". After that, the pumping direction flag is turned to "1" and a time until the next timer interruption is set. When the present polarity of the pumping output is "H", a low level signal is sent from output port P0 in step 45 and the polarity of the pumping output is turned to "L". After that, the pumping direction flag is turned to "0" and a time until the next timer interruption is set. In step 48, the pumping flag is turned to "1" and the timer interruption is ended.

If the main routine is executed normally, then the step 31 is surely executed so that the pumping flag becomes "1" at the timer interruption. Accordingly, an On-Off signal is sent from output port P0 based on the timer set by step 44 and step 47. Accordingly the frequency and duty ratio of the signal is constant. If the main routine is abnormal and the step 31 is not executed, then the polarity of the output port P0 is not turned at the timer interruption so that the frequency and duty ratio of the signal from the output port P0 is disturbed. In this case, the microcomputer 1 is reset by the runaway resetting circuit 2.

Moreover, when the value of an internal register of the microcomputer 1 is changed from the initial value to another value, the polarity of the output port P0 is not turned at the timer interruption so that the frequency and duty ratio of the signal from the output port P0 is disturbed. Accordingly, the microcomputer 1 is reset by the runaway resetting circuit 2.

In this embodiment, the runaway resetting circuit 2 resets the microcomputer 1, however the runaway resetting circuit is able to initialize the other circuit, for example, the driving circuit of the load.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What is claimed is:

1. An abnormal watching method for a microcomputer comprising the steps of:
   determining whether a routine of the microcomputer is normally executed;
   reading an initial value of an internal register of said microcomputer;
   generating a normal signal when said determining step determines that the routine is normally executed; and
   reading a present value of the internal register of said microcomputer, comparing the present value of said internal register with the initial value of said internal register, and suspending the step of generating said normal signal when the present value of said internal register is not equal to the initial value even if said determining step still determines that the routine is normally executed.

2. An abnormal watching method for a microcomputer comprising:
   setting in the main routine of said microcomputer a flow watching routine and setting a pumping flag when the flow watching routine is executed;
   reading on initial value of an internal register of said microcomputer;
   sending a normal signal when said pumping flag is set;
   reading a present value of the internal register of said microcomputer, comparing the present value of said internal register with the initial value of said internal register, and suspending the sending of said normal signal when the present value of the internal register is not equal to the initial value even if said pumping flag is set.

3. An abnormal watching device for a microcomputer comprising:
   means for determining whether a flow watching routine is executed, and for setting a pumping flag when the flow watching routine is executed;
   reading an initial value of an internal register of said microcomputer,
   signal sending means for sending a normal signal when said pumping flag is set by said determining means; and
   internal register comparing means which reads a present value of the internal register of said microcomputer, compares the present value of said internal register with the initial value of said internal register, and suspends the sending of the normal signal by said signal sending means when the present value of the internal register is not equal to its initial value even if the pumping flag is set.

4. The abnormal watching device according to claim 3, wherein said internal register comprises a plurality of registers, and wherein said internal register comparing means suspends the sending of the normal signal when any one of said plurality of registers is not equal to its initial value.

5. The abnormal watching device according to claim 3, further comprising a runaway resetting circuit for receiving the normal signal from said microcomputer when said pumping flag is set, said runaway resetting circuit being operable for determining whether the normal signal is within a predetermined range of frequencies and being operable for resetting said microcomputer when the normal signal is not within the predetermined range of frequencies.

6. The abnormal watching device according to claim 5, wherein said runaway resetting circuit includes a frequency-voltage circuit for receiving the normal signal and for outputting a voltage according to the frequency of the normal signal.

7. The abnormal watching device according to claim 6, wherein said runaway resetting circuit further includes first comparing means for comparing the output voltage of said frequency-voltage circuit with a predetermined range of voltages representing the predetermined range of frequencies.

8. An abnormal watching device for a microcomputer comprising:
   means for determining whether a flow watching routine is executed, and for setting a pumping flag when the flow watching routine is executed;
   signal sending means for sending a normal signal when said pumping flag is set by said determining means;
   internal register comparing means which reads an internal register of said microcomputer, compares the value of said internal register with an initial value of said internal register, and suspends the sending of the normal signal by said signal sending means when the value of the internal register is not equal to its initial value even if the pumping flag is set; and
   a runaway resetting circuit for receiving the normal signal from said signal sending means when said pumping flag is set and said signal sending means is not suspended by said internal register comparing means, said runaway resetting circuit being operable for determining whether the normal signal is within a predetermined range of frequencies and being operable for resetting said microcomputer when the normal signal is not within the predetermined range of frequencies;
   wherein said runaway resetting circuit includes a frequency-voltage circuit for receiving the normal signal and for outputting a voltage according to the frequency of the normal signal, first comparing means for comparing the output voltage of said frequency-voltage circuit with a predetermined range of voltages representing the predetermined range of frequencies, a duty ratio-voltage exchange circuit for receiving the normal signal and for outputting a voltage depending on the duty ratio of the normal signal, second comparing means for comparing the output of said duty ratio-voltage exchange circuit with a predetermined range of voltages representing a predetermined range of duty ratios, and gate means connected to said first and second comparing means, said gate means being operable for resetting said microcomputer when the output voltage of said frequency-voltage exchange circuit is outside of the predetermined range of voltages representing the predetermined range of frequencies or when the output voltage of said duty-ratio voltage exchange circuit is outside of the range of predetermined voltages representing the predetermined range of duty ratios.

* * * * *